(12) United States Patent
Kim et al.

(10) Patent No.: US 9,684,116 B2
(45) Date of Patent: Jun. 20, 2017

(54) LIGHT GUIDE PLATE, AND BACKLIGHT UNIT AND DISPLAY DEVICE INCLUDING THE SAME

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Yangju-si (KR)

( * ) Notice: Subject to any disclaimer, the term of this patent is extended or adjusted under 35 U.S.C. 154(b) by 1 day.

(21) Appl. No.: 14/828,629

(22) Filed: Aug. 18, 2015

(65) Prior Publication Data

US 2016/0047970 A1    Feb. 18, 2016

Related U.S. Application Data

(60) Provisional application No. 62/038,723, filed on Aug. 18, 2014.

(30) Foreign Application Priority Data

Mar. 31, 2015  (KR) ........................ 10-2015-0045734

(51) Int. Cl.
*G02B 6/36*   (2006.01)
*F21V 8/00*   (2006.01)

(52) U.S. Cl.
CPC ......... *G02B 6/0045* (2013.01); *G02B 6/0055* (2013.01); *G02B 6/0036* (2013.01); *G02B 6/0065* (2013.01)

(58) Field of Classification Search
CPC .. G02B 6/0055; G02B 6/0045; G02B 6/0036; G02B 6/0065
See application file for complete search history.

(56) References Cited

U.S. PATENT DOCUMENTS

| | | | | |
|---|---|---|---|---|
| 4,519,686 A | * | 5/1985 | Seki ........................ | G03B 13/24 359/454 |
| 4,598,977 A | * | 7/1986 | Kobayashi ............. | G02B 27/40 359/574 |
| 5,089,835 A | * | 2/1992 | Kitagishi ............... | G03B 13/24 359/569 |
| 6,081,376 A | * | 6/2000 | Hansen ............. | G02F 1/133536 359/485.05 |

(Continued)

*Primary Examiner* — Anh Mai
*Assistant Examiner* — Fatima Farokhrooz

(57) ABSTRACT

Provided are a light guide plate, and a backlight unit and a display device including the same. A light guide plate includes a light output surface configured to output light to the outside; a reflective surface positioned opposite the light output surface; a light incident surface provided on at least one side surface of side surfaces which connect the light output surface and the reflective surface, and configured to receive light projected from a light source; and a reflection pattern including an embossed portion having a circular shape and configured to protrude to the outside of the reflective surface when viewed in a direction perpendicular to the reflective surface, and a concave portion having a ring shape which surrounds the embossed portion and recessed in the reflective surface when viewed in a direction perpendicular to the reflective surface. Here, the center of the embossed portion is provided to be different from the center of the concave portion.

20 Claims, 16 Drawing Sheets

(56) References Cited

U.S. PATENT DOCUMENTS

| | | | | | |
|---|---|---|---|---|---|
| 6,204,903 | B1* | 3/2001 | Hayashi | | G02B 5/00 349/113 |
| 8,419,263 | B2* | 4/2013 | Wang | | G02B 6/0036 362/615 |
| 2004/0051826 | A1* | 3/2004 | Lee | | G02F 1/133553 349/113 |
| 2004/0141304 | A1* | 7/2004 | Nagakubo | | G02B 6/0038 362/612 |
| 2005/0024849 | A1* | 2/2005 | Parker | | F21V 5/00 362/600 |
| 2005/0243575 | A1* | 11/2005 | Kunimochi | | G02B 6/0038 362/606 |
| 2005/0270802 | A1* | 12/2005 | Hsu | | G02F 1/133615 362/626 |
| 2006/0181661 | A1* | 8/2006 | Kudou | | G02F 1/133553 349/114 |
| 2008/0025687 | A1* | 1/2008 | Lee | | G02B 6/0036 385/146 |
| 2009/0122229 | A1* | 5/2009 | Kim | | G02B 6/0038 349/65 |
| 2009/0279324 | A1* | 11/2009 | Chen | | G02B 6/0036 362/616 |
| 2010/0014316 | A1* | 1/2010 | Yue | | G02B 6/0036 362/619 |
| 2010/0085642 | A1* | 4/2010 | Drinkwater | | F21V 33/006 359/567 |
| 2010/0208496 | A1* | 8/2010 | Kim | | B29D 11/00663 362/613 |
| 2010/0302805 | A1* | 12/2010 | Jeong | | G02B 6/0061 362/612 |
| 2011/0109533 | A1* | 5/2011 | Suzuki | | G02B 6/0038 345/84 |
| 2011/0228556 | A1* | 9/2011 | Wang | | G02B 6/0036 362/606 |
| 2012/0201045 | A1* | 8/2012 | Gotou | | G02B 6/0061 362/602 |
| 2013/0093980 | A1* | 4/2013 | Goto | | G02B 6/0038 349/65 |
| 2013/0242612 | A1* | 9/2013 | Lee | | G02B 6/0036 362/613 |
| 2014/0204612 | A1* | 7/2014 | Song | | G02B 6/0036 362/611 |
| 2015/0092440 | A1* | 4/2015 | Kim | | G02B 6/0036 362/608 |

* cited by examiner

LIGHT GUIDE PLATE, AND BACKLIGHT UNIT AND DISPLAY DEVICE INCLUDING THE SAME

RELATED APPLICATIONS

This application claims the benefit of priority of both U.S. Provisional Patent Application No. 62/038,723 filed on Aug. 18, 2014, and Korean Patent Application No. 10-2015-0045734 filed on Mar. 31, 2015. The contents of the above applications are all incorporated by reference as if fully set forth herein in their entirety.

FIELD AND BACKGROUND OF THE INVENTION

The present invention relates to a light guide plate, a backlight unit and a display device including the same, and more particularly, a light guide plate capable of improving a light diffusion degree, and a backlight unit and a display device including the same.

As a backlight unit (BLU) is one type of light source devices which supply light to the rear surface of a screen of each liquid crystal display (LCD) device, the BLU influences image qualities, such as the luminance of an image, color reproducibility, a viewing angle, a contrast range, legibility, etc., power consumption, a product lifetime, etc., and is a core component which accounts for approximately 20 to 50% of an overall cost of the LCD device.

The BLU is largely classified as a direct-lit type and an edge-lit type according to an arrangement position of a light source. The direct-lit type uses light projected from the light source disposed in the direct rear of a screen light and moved in a direction of a liquid crystal panel, but the edge-lit type supplies light to a display panel by guiding light projected from a light source disposed on an edge of a screen in a side direction to a liquid crystal panel using a light guide plate. Due to a structural difference between the direct-lit type and the edge-lit type, the direct-lit type has advantages for luminance, a contrast range, screen uniformity, image reproducibility, etc., and the edge-lit type has advantages for a product thickness and costs.

Recently, edge-lit type backlights having an advantage of a product exterior have been increasingly important in the display industry because a display product becomes more important for the value of an indoor interior decoration. Particularly, the trend of consumer demands for ultra-thin display products is increasing and studies for reducing diffusion sheets, about 3 to 5 diffusion sheets disposed in the rear of a display panel, as much as possible are actively conducted according to the trend. This type of the display product has problems that a light diffusion degree thereof is difficult to secure as much as that of existing diffusion sheets and a hot spot is issued due to the light diffusion degree. Therefore, the development of a light guide plate capable of improving the light diffusion degree is emerging as a key technology.

SUMMARY OF THE INVENTION

The present invention is directed to providing a light guide plate capable of improving a light diffusion degree, and a backlight unit and a display device including the same.

One aspect of the present invention provides a light guide plate including a light output surface configured to output light to the outside; a reflective surface positioned opposite the light output surface; a light incident surface provided on at least one side surface of side surfaces which connect the light output surface and the reflective surface, and configured to receive light projected from a light source; and a reflection pattern including an embossed portion having a circular shape and configured to protrude to the outside of the reflective surface when viewed in a direction perpendicular to the reflective surface, and a concave portion having a ring shape which surrounds the embossed portion and recessed in the reflective surface when viewed in a direction perpendicular to the reflective surface. Here, the center of the embossed portion is provided to be different from the center of the concave portion.

Another aspect of the present invention provides a backlight unit including a light source configured to project light; and a light guide plate. The light guide plate includes a light incident surface which faces the light source and receives the light projected from the light source, a light output surface which is perpendicular to the light incident surface and outputs the light to the outside, and a reflective surface opposite the light output surface, and a reflection pattern provided on the reflective surface. Further, the reflection pattern includes an embossed portion having a circular shape and configured to protrude from the reflective surface when viewed in a direction perpendicular to the reflective surface, and a concave portion having a ring shape which surrounds the embossed portion and recessed in the reflective surface when viewed in a direction perpendicular to the reflective surface. Here, the center of the embossed portion and the center of the concave portion are provided to be different.

According to the embodiment of the present invention, light is scattered by the embossed portion and the concave portion in the light guide plate, and thus a degree of scattering or diffusion of the light output from the light guide plate can be improved.

Further, according to the embodiment of the present invention, since the light guide plate capable of improving the degree of scattering is used, a hot spot can be improved.

DESCRIPTION OF SPECIFIC EMBODIMENTS OF THE INVENTION

Figure 1:
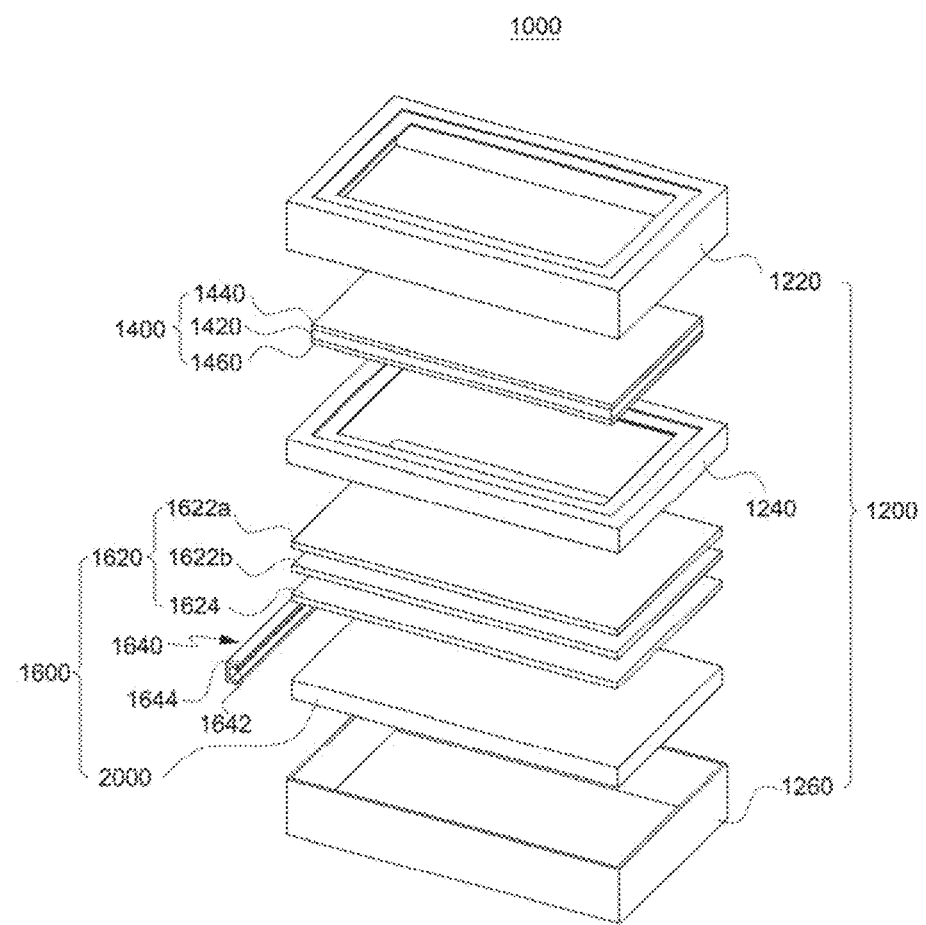
FIG. 1 is an exploded perspective view of a display device according to one embodiment of the present invention.

Hereinafter, a light guide plate according to one embodiment of the present invention, and a backlight unit and a display device including the same will be described with reference to the accompanying drawings in detail.

Further, the same or corresponding components may be assigned with the same or similar reference numerals regardless of drawing numerals and the repetitive description thereof will be omitted. The size and shape of each component shown for the sake of convenience of the description may be exaggerated or reduced.

One aspect of the present invention provides a light guide plate including a light output surface configured to output light to the outside; a reflective surface positioned opposite the light output surface; a light incident surface provided on at least one side surface of side surfaces which connect the light output surface and the reflective surface, and configured to receive light projected from a light source; and a reflection pattern including an embossed portion having a circular shape and configured to protrude to the outside of the reflective surface when viewed in a direction perpendicular to the reflective surface, and a concave portion having a ring shape which surrounds the embossed portion and recessed in the reflective surface when viewed in a direction perpendicular to the reflective surface. Here, the center of the embossed portion is provided to be different from the center of the concave portion.

The center of the concave portion may be provided to be closer to the light incident surface than the center of the embossed portion.

In the concave portion, a recessed depth of one side and a recessed depth of the other side based on the center of the embossed portion may be different.

In the concave portion, a recessed depth of one side close to the light incident surface based on the center of the embossed portion may be greater than the other side.

An outer diameter of the concave portion may be 1.05 to 1.3 times an outer diameter of the embossed portion.

The embossed portion may have a recessed region recessed in a direction of the light output surface.

A longitudinal direction of the recessed region may be provided to be perpendicular to a direction from the center of the embossed portion toward the center of the concave portion.

The recessed region may be substantially formed in an elliptical shape in a bottom view.

In the embossed portion, a protruding height of one side and a protruding height of the other side based on the recessed region may be different.

In the embossed portion, a protruding height of a side close to the light incident surface based on the recessed region may be greater than a protruding height of a side far from the light incident surface.

The reflection pattern may further include an outer portion having a ring shape which surrounds the concave portion and configured to protrude to the outside of the reflective surface when viewed in a direction perpendicular to the reflective surface.

Another aspect of the present invention provides a backlight unit including a light source configured to project light and a light guide plate. The light guide plate includes a light incident surface which faces the light source and receives the light projected from the light source, a light output surface which is perpendicular to the light incident surface and outputs the light to the outside, and a reflective surface opposite the light output surface, and a reflection pattern provided on the reflective surface. Further, the reflection pattern includes an embossed portion having a circular shape and configured to protrude from the reflective surface when viewed in a direction perpendicular to the reflective surface, and a concave portion having a ring shape which surrounds the embossed portion and recessed in the reflective surface when viewed in a direction perpendicular to the reflective surface. Here, the center of the embossed portion and the center of the concave portion are provided to be different.

The center of the concave portion may be provided to be closer to the light incident surface than the center of the embossed portion.

In the concave portion, a recessed depth of one side and a recessed depth of the other side based on the center of the embossed portion may be different.

In the concave portion, a recessed depth of one side close to the light incident surface based on the center of the embossed portion may be greater than the other side.

An outer diameter of the concave portion may be 1.05 to 1.3 times an outer diameter of the embossed portion.

The embossed portion may have a recessed region recessed in the light output surface direction.

A longitudinal direction of the recessed region may be provided to be perpendicular to a direction from the center of the embossed portion toward the center of the concave portion.

In the embossed portion, a protruding height of a side close to the light incident surface based on the recessed region may be greater than a protruding height of a side far from the light incident surface.

The reflection pattern may further include an outer portion having a ring shape which surrounds the concave portion and configured to protrude to the outside of the reflective surface when viewed in a direction perpendicular to the reflective surface.

Hereinafter, a display device 1000 according to one embodiment of the present invention will be described. Here, the display device 1000 should be interpreted as a concept including all of a variety of display devices which output images in addition to liquid crystal display (LCD) devices, plasma display panel (PDP) display devices, and organic light-emitting diode (OLED) display devices. However, it will be described based on the LCD device 1000 for the sake of convenience of the description below.

Figure 2:
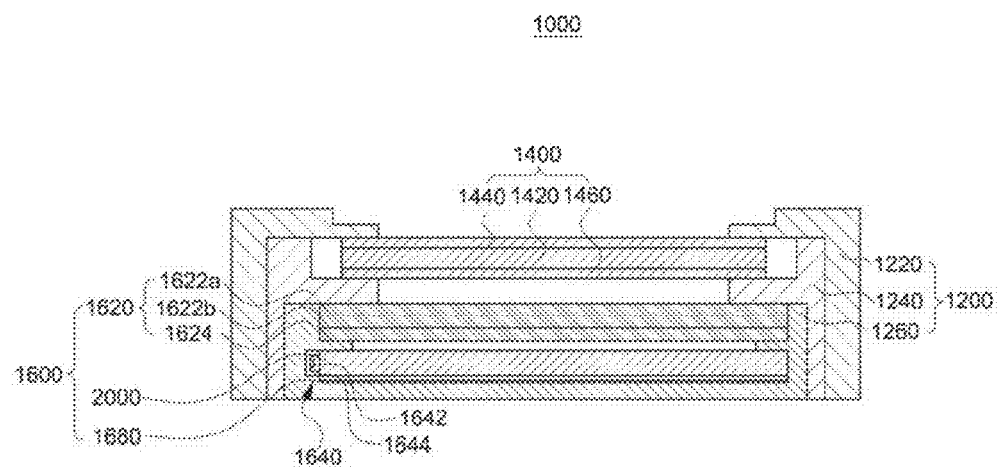
FIG. 2 is a cross-sectional view of the display device according to one embodiment of the present invention.

FIG. 1 is an exploded perspective view of the display device 1000 according to one embodiment of the present invention, and FIG. 2 is a cross-sectional view of the display device 1000 according to one embodiment of the present invention.

Referring to FIGS. 1 and 2, the display device 1000 may include a housing 1200, a display panel 1400, and a backlight unit 1600.

The housing 1200 accommodates the display panel 1400 and the backlight unit 1600 therein to protect from external impacts. Further, the housing 1200 serves to connect the display panel 1400 and the backlight unit 1600.

The housing 1200 may include a top case 1220, a guide frame 1240, and a bottom cover 1260. The top case 1220 and the bottom cover 1260 are coupled to respectively cover a front surface and a rear surface of the display device 1000, and the guide frame 1240 is mounted therebetween. The guide frame 1240 may fix the display panel 1400 with a bezel of the top case 1220 and may also fix a light guide plate 2000 and optical sheets 1620 with the bottom cover 1260.

The display panel 1400 displays an image using light supplied from the backlight unit 1600.

The display panel 1400 may include two transparent substrates and a liquid crystal layer 1420 interposed between the transparent substrates. Here, each of the transparent substrates may be a color filter substrate 1460 or a thin film transistor (TFT) substrate 1440. When an electrical signal is applied to the liquid crystal layer 1420 through a gate line and a data line of the TFT substrate 1440, the orientation of liquid crystals is changed, the liquid crystals selectively pass light projected from the backlight unit 1600 by pixel units, and the passed light is changed to color light by the color filter substrate 1460 to output an image. Here, the TFT substrate 1440 may be electrically connected to a panel driver (not shown), such as a chip-on-film (COF) or tape carrier package (TCP), through a printed circuit board (PCB) (not shown) and may receive a control signal.

The backlight unit 1600 supplies light to the rear of the display panel 1400 so that the display panel 1400 outputs an image.

The backlight unit 1600 may include an optical sheet 1620, a light source array 1640, a light guide plate 2000, and a reflective plate 1680.

The light source array 1640 may include a light source 1642 for generating light and a light source substrate 1644 on which the light source 1642 is installed. The light source 1642 may include a cold cathode fluorescent lamp (CCFL), an external electrode fluorescent lamp (EEFL), a light emitting diode (LED), etc. In the case of an edge-lit type backlight unit 1600, in order to project light to a side surface of the light guide plate 2000, the light source array 1640 may be installed on an edge of the display device 1000 so that light of the light source 1642 is projected in a side direction of the light guide plate 2000. In the case of a direct-lit type backlight unit 1600, the light source 1642 may be installed on the bottom cover 1260 to output light to the rear of the display panel 1400, and at this time, the light source substrate 1644 may be installed on the bottom cover 1260, or the light source substrate 1644 may be removed and the light source 1642 may be directly installed on the bottom cover 1260.

The light guide plate 2000 may be disposed to face a rear surface of the display panel 1400, in the edge-lit type backlight unit 1600. The light guide plate 2000 serves to guide light output in a side direction from the light source 1642 toward the display panel 1400. Further, patterns may each be formed on an upper surface, a lower surface, and a side surface of the light guide plate 2000, the side surface being beside the light source 1642, to improve the uniformity of light such as improving luminance, hot spots, etc. Further, a material including poly methyl methacrylate (PMMA), methyl styrene (MS), methyl methacrylate (MMA), glass, or the like may be used for the material of the light guide plate 2000. The detailed description for the light guide plate 2000 will be described below. Meanwhile, in the case of the direct-lit type backlight unit 1600, a diffusion plate which diffuses light may be provided instead of the light guide plate 2000 which guides light.

The optical sheet 1620 is disposed to face the display panel 1400 in the rear of the display panel 1400, and when there is a light guide plate 2000, the optical sheet 1620 may be disposed between the display panel 1400 and the light guide plate 2000. An example of the optical sheet 1620 is a diffusion sheet 1624 or prism sheet 1622. The diffusion sheet 1624 improves the uniformity of light output dispersion because light output from the light guide plate 2000 or diffusion plate is evenly diffused, and the occurrence of a dark/bright pattern, such as a moire phenomenon, or hot spots may be reduced or removed. The prism sheet 1622 may adjust a path of light in a direction perpendicular to the display panel 1400. Light passed through the light guide plate 2000 or diffusion sheet 1624 disperses and moves in a forward direction and the prism sheet 1622 guides the dispersed light in a direction perpendicular to the display panel 1400, and thus the luminance and viewing angle of the display device 1000 can be improved. For example, as shown in FIGS. 1 and 2, in the optical sheet 1620, a vertical prism sheet 1622a, a horizontal prism sheet 1622b, and the diffusion sheet 1624 may be sequentially disposed from the display panel 1400. The arrangement order in the optical sheet 1620 does not have to be the same as the above-described order. That is, a part of the optical sheet 1620 may be removed or may use a number of sheets (e.g., two or more diffusion sheets 1624) and the order may be suitably changed if needed.

The reflective plate 1680 may be attached to the bottom cover 1260. The reflective plate 1680 may reflect light, which is output from the light source 1642 and moved in a rearwards direction, to the display panel 1400. Since the reflective plate 1680 reflects the light moved in a direction of a rear surface of the light guide plate 2000 or diffusion plate to the display panel 1400, the loss of light is reduced, and thus the overall luminance of the display is improved.

Hereinafter, the light guide plate 2000 according to one embodiment of the present invention will be described in more detail.

Figure 3:
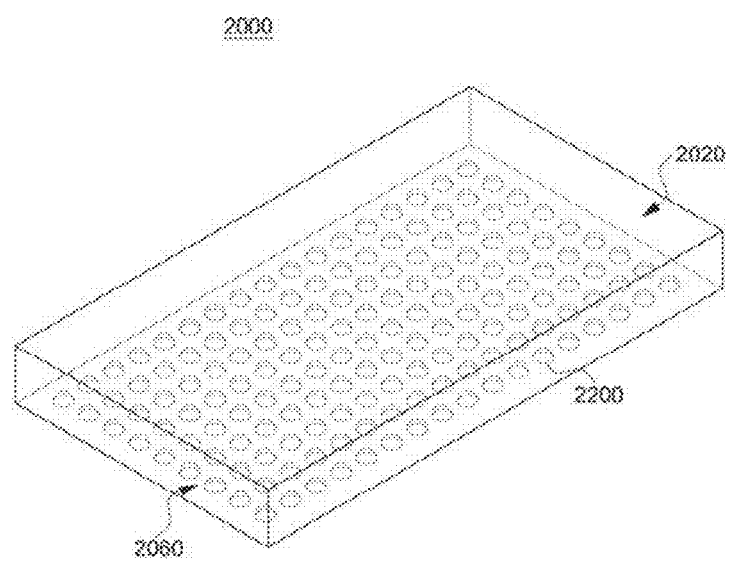
FIG. 3 is a perspective view of a light guide plate according to one embodiment of the present invention.
Figure 4:
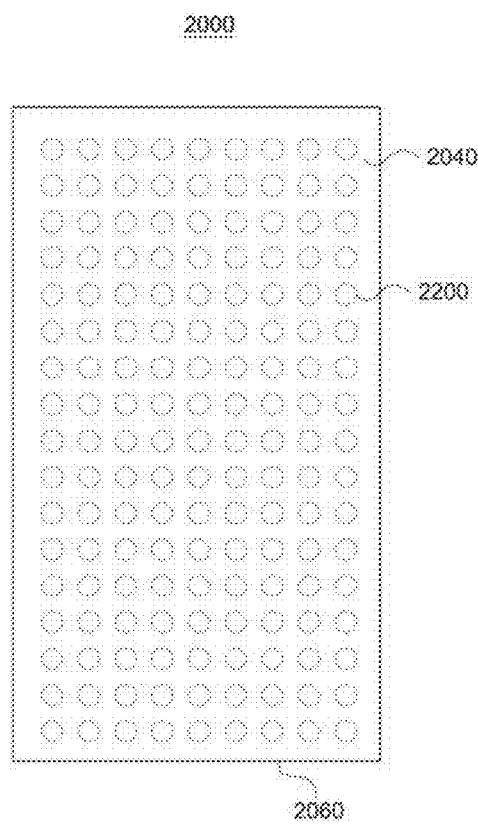
FIG. 4 is a rear view of the light guide plate in which the density of reflection patterns according to one embodiment of the present invention is uniform.
Figure 5:
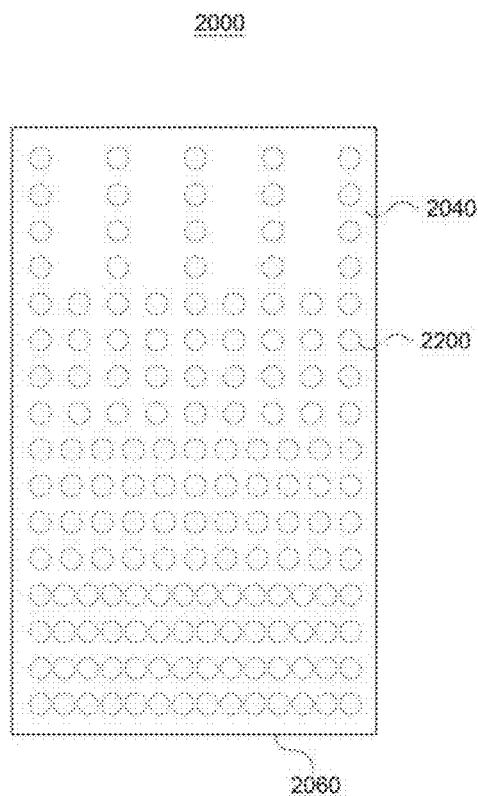
FIG. 5 is a rear view of the light guide plate in which the density of the reflection patterns according to one embodiment of the present invention is non-uniform.
Figure 6:
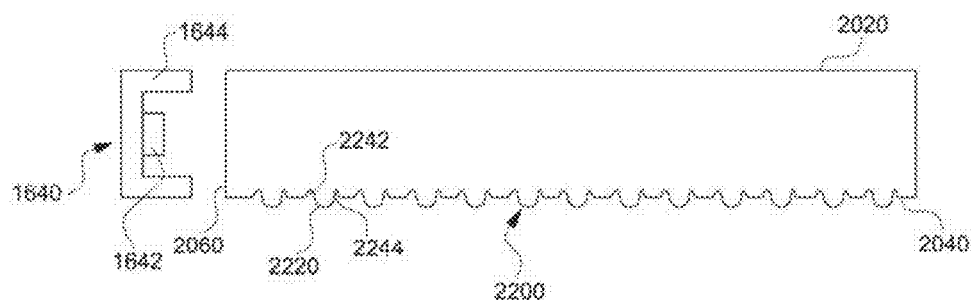
FIG. 6 is a cross-sectional view of the light guide plate according to one embodiment of the present invention.
Figure 7:
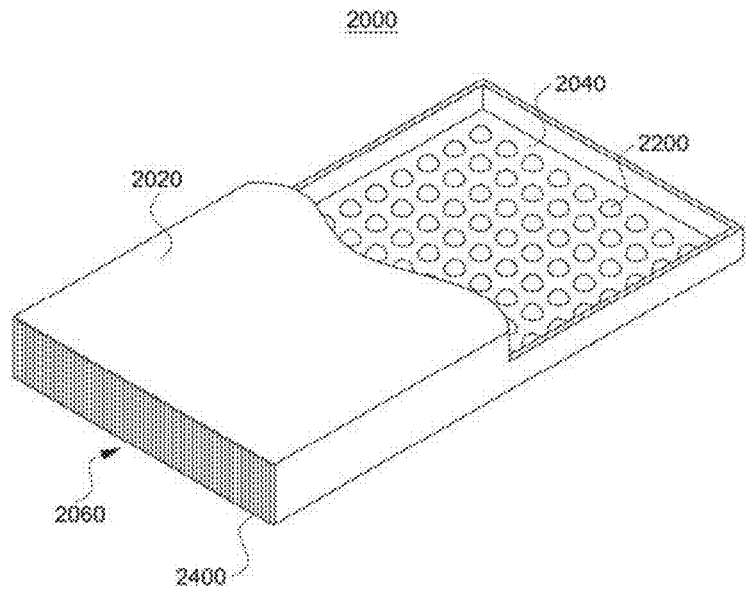
FIG. 7 is a perspective view of the light guide plate of which a light incident surface according to one embodiment of the present invention has a pattern.
Figure 8:
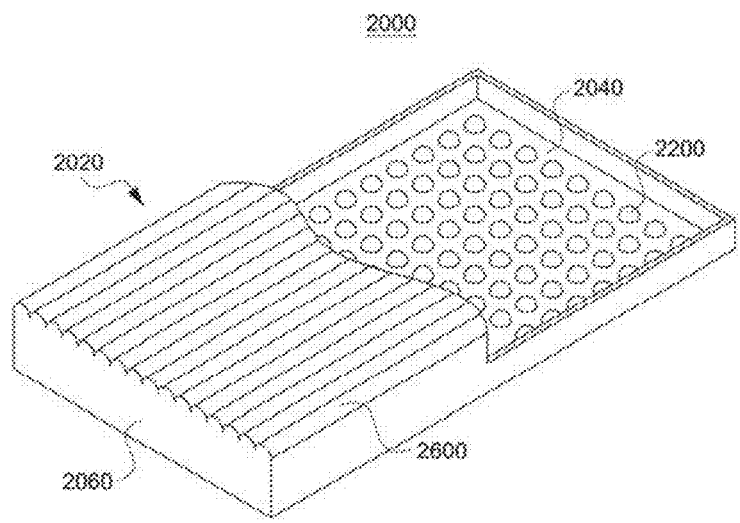
FIG. 8 is a perspective view of the light guide plate of which a light output surface according to one embodiment of the present invention has a pattern.

FIG. 3 is a perspective view of the light guide plate 2000 according to one embodiment of the present invention, FIG. 4 is a rear view of the light guide plate 2000 in which the density of reflection patterns 2200 according to one embodiment of the present invention is uniform, FIG. 5 is a rear view of a light guide plate 2000 in which the density of the reflection patterns 2200 according to one embodiment of the present invention is non-uniform, FIG. 6 is a cross-sectional view of the light guide plate 2000 according to one embodiment of the present invention, FIG. 7 is a perspective view of the light guide plate 2000 of which a light incident surface 2060 according to one embodiment of the present invention has a pattern, and FIG. 8 is a perspective view of the light guide plate 2000 of which a light output surface 2020 according to one embodiment of the present invention has a pattern.

Referring to FIGS. 3, 4, 5, 6, 7 and 8, the light guide plate 2000 may be provided in a plate shape. Thus, the light guide plate 2000 may have a pair of primary surfaces and side surfaces which connect the primary surfaces. An upper surface of the pair of primary surfaces close to the display panel 1400 is a light output surface 2020 which outputs light to the display panel 1400, and the opposite surface thereof is a reflective surface 2040 which reflects light. Further, at least one surface of the side surfaces is disposed to face the light source 1642 and is the light incident surface 2060 which receives light. Generally, since the display device 1000 has a tetragonal screen, the light guide plate 2000 may also have a shape of a tetragonal plate corresponding thereto. In the case of the light guide plate 2000 in a shape of a tetragonal plate, any one surface, a pair of vertically facing surfaces, or a pair of laterally facing surfaces of four side surfaces may become the light incident surface 2060. Meanwhile, FIG. 3 illustrates that the light guide plate 2000 is a planar plate of which the thickness is entirely uniform, but the present invention is not limited thereto. For example, in the light guide plate 2000, it is possible that portions around a side surface thereof facing the light source 1642 may be thicker than other portions thereof to improve the efficiency of incident light.

The light guide plate 2000 receives light projected from the light source 1642 through the light incident surface 2060 and the light is guided by the light guide plate 2000 to be output in a face form of the light source 1642 through the light output surface 2020. The reflective surface 2040 serves to reflect light moved to a rear surface of the light guide plate 2000 to the light output surface 2020. Patterns for effectively receiving, guiding, and reflecting light may be respectively formed on the light incident surface 2060, the light output surface 2020, and the reflective surface 2040, and particularly, the reflection pattern 2200 may be formed on the reflective surface 2040 to reflect light moved to the rear surface of the light guide plate 2000, i.e., moved to the reflective surface 2040.

A plurality of reflection patterns 2200 may be formed on the reflective surface 2040. Here, the reflection patterns 2200 may be formed on the reflective surface 2040 with uniform density as shown in FIG. 4 or may be formed with non-uniform density as shown in FIG. 5. Particularly, in the case of a large screen, a difference of luminance between a region close to the light incident surface 2060 of the light guide plate 2000 and a region far therefrom may be generated, but the difference of luminance may be reduced by forming the reflection patterns 2200 more densely on the region far from the light incident surface 2060 than the region close thereto. Here, the density of the reflection patterns 2200 may be defined by a cover rate which means a ratio of the reflection patterns 2200 to the reflective surface 2040, a size of the reflection pattern 2200, an interval of the reflection patterns 2200, etc.

The reflection pattern 2200 may be formed by a silk screening technique or laser etching technique, a deposition technique, a pressing technique, a roll stamping technique, etc. The reflection pattern 2200 may be formed in a specific form to effectively refract or reflect light moved to the rear surface of the light guide plate 2000 to the light output surface 2020 by the above-described process and detailed descriptions for the formation of the reflection pattern 2200 will be described below.

Meanwhile, a serration pattern 2400 may be formed on the light incident surface 2060 of the light guide plate 2000 to improve a distribution angle of light incident from the light source 1642 and to increase a diffusion effect. The serration pattern 2400 may be formed on the light incident surface 2060 so that an embossed portion and a concave portion extending in a vertical direction as shown in FIG. 7 are repeatedly disposed in a direction of the width of the light incident surface 2060. Further, a light guide pattern 2600 for guiding light incident through the light incident surface 2060 to all regions of the light guide plate 2000 may be formed on the light output surface 2020 of the light guide plate 2000. The light guide pattern 2600 may be repeatedly formed on the light output surface 2020 to extend in a direction perpendicular to the light incident surface 2060, and may have a lenticular pattern form as shown in FIG. 8 or may be formed in a trigonal or tetragonal prism pattern form.

The above-described serration pattern 2400 or light guide pattern 2600 may be provided to the light guide plate 2000 with the reflection pattern 2200, and in some cases, the serration pattern 2400, the light guide pattern 2600, and the reflection pattern 2200 may all be formed on the light guide plate 2000.

Hereinafter, the reflection pattern 2200 according to one embodiment of the present invention will be described.

The reflection pattern 2200 is formed in a specific form by protruding from or being recessed in the reflective surface 2040, and thus light moved to the rear surface of the light guide plate 2000 may be reflected. When the light is reflected as described above, an amount of light output through the light output surface 2020 of the light guide plate 2000 is eventually increased, and thus the luminance of the display device 1000 can be increased.

In the embodiment of the present invention, the reflection pattern 2200 may be basically provided in a dot pattern form. The entire reflection pattern 2200 may have a region protruding from the reflective surface 2040 in a circular shape, a recessed region surrounding the protruding region, and a protruding region surrounding the recessed region when viewed in a direction perpendicular to the reflective surface 2040.

The reflection pattern 2200 may be mainly formed by roll stamping or pressing. Specifically, the recessed region may be formed by applying pressure to the reflective surface 2040 using roll stamping or pressing, and the protruding region may be formed because a material in the recessed region is moved to the vicinity thereof. At this time, roll stamping or pressing using a thermal pressing method can effectively perform the above patterning process.

The reflection pattern 2200 reflects, refracts, or scatters light which is incident from the light incident surface 2060 and moved to the reflective surface 2040, or light which is reflected from the light output surface 2020 and moved to the reflective surface 2040 in each region, and thus light can be effectively reflected. Specifically, an outer protruding region of the reflection pattern 2200 first refracts, scatters, diffuses, or reflects light, and a recessed region and a central protruding region may refract, scatter, diffuse, or reflect the light again. Particularly, since the outer protruding region serves to first scatter light incident on the reflection pattern 2200, it has an advantageous effect of increasing the luminance uniformity of the entire light output surface 2020.

Hereinafter, a first sample of various forms for the reflection pattern 2200 according to one embodiment of the present invention will be described.

Figure 9:
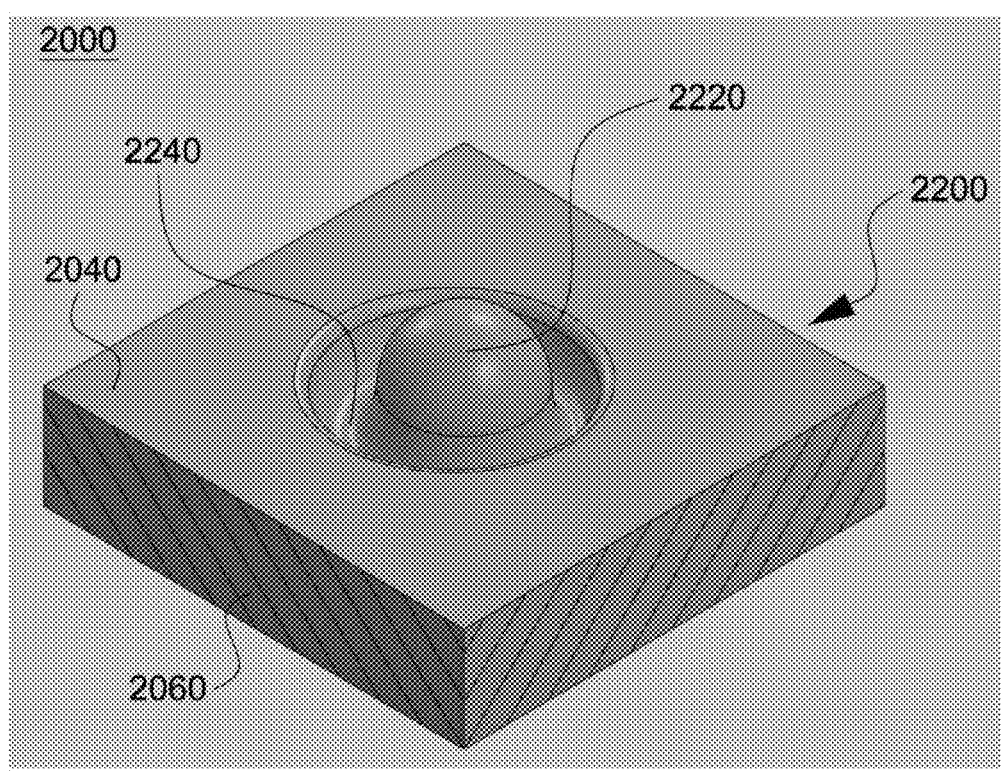
FIG. 9 is a perspective view of a first sample of a reflection pattern according to one embodiment of the present invention.
Figure 10:
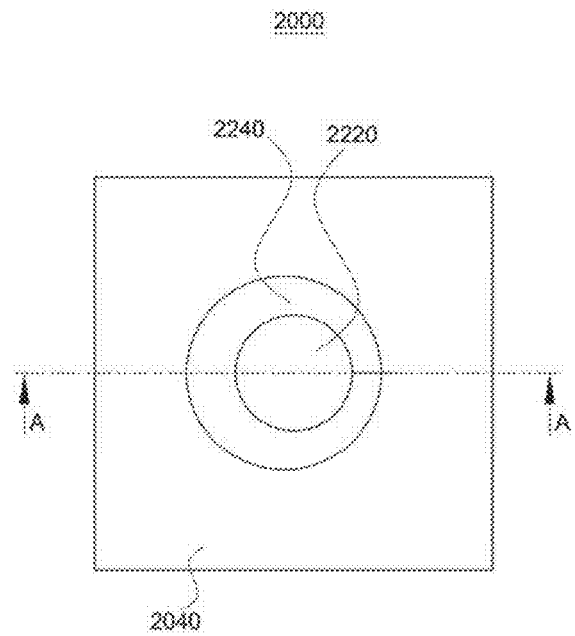
FIG. 10 is a plan view of the first sample of the reflection pattern according to one embodiment of the present invention.
Figure 11:
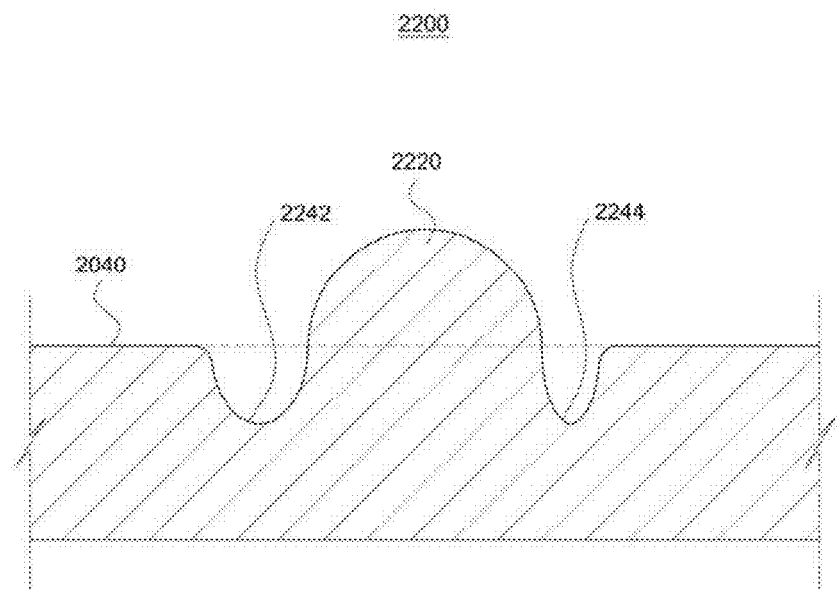
FIG. 11 is a cross-sectional view of the first sample of the reflection pattern according to one embodiment of the present invention.

FIG. 9 is a perspective view of the first sample of the reflection pattern 2200 according to one embodiment of the present invention, FIG. 10 is a plan view of the first sample of the reflection pattern 2200 according to one embodiment of the present invention, and FIG. 11 is a cross-sectional view of the first sample of the reflection pattern 2200 according to one embodiment of the present invention.

Referring to FIGS. 9, 10 and 11, a first form of the reflection pattern 2200 according to one embodiment of the present invention may include an embossed portion 2220 and a concave portion 2240.

The embossed portion 2220 is positioned at the center of the reflection pattern 2200 and is a portion protruding to the outside of a level of the reflective surface 2040. Here, the embossed portion 2220 may be formed in a circular shape when viewed in a direction perpendicular to the reflective surface 2040. The embossed portion 2220 may have an entirely hemispherical shape and may protrude to the outside of the level of the reflective surface 2040.

The concave portion 2240 is positioned to surround the embossed portion 2220, and is a portion recessed under the level of the reflective surface 2040.

The concave portion 2240 may be formed in a ring shape when viewed in a direction perpendicular to the reflective surface 2040. Here, an outer circumference of the concave portion 2240 may be formed in a circular shape, and the circular shape may be formed in various shapes, such as a lined circular shape, an elliptical shape, etc., even when the circular shape is not a perfectly circular shape. Further, the center of the ring forming the concave portion 2240 may be different from the center of a circle forming the embossed portion 2220. That is, the concave portion 2240 may be formed to lean to one side. Here, since the centers of the concave portion 2240 and the embossed portion 2220 are different, intervals from the outer circumference of the concave portion 2240 to the center of the circle forming the embossed portion 2220 may be different. For example, the interval from the outer circumference of the concave portion 2240 to the center of the circle forming the embossed portion 2220 may be the greatest in a direction perpendicular to incident light, or the interval from the outer circumference of the concave portion 2240 to the center of the circle forming the embossed portion 2220 may be the greatest in a direction parallel to incident light. Further, in the first form of the reflection pattern 2200, the concave portion 2240 may be recessed to have the same depth in the entire ring shape.

Hereinafter, a second sample of various forms for the reflection pattern 2200 according to one embodiment of the present invention will be described.

Figure 12:
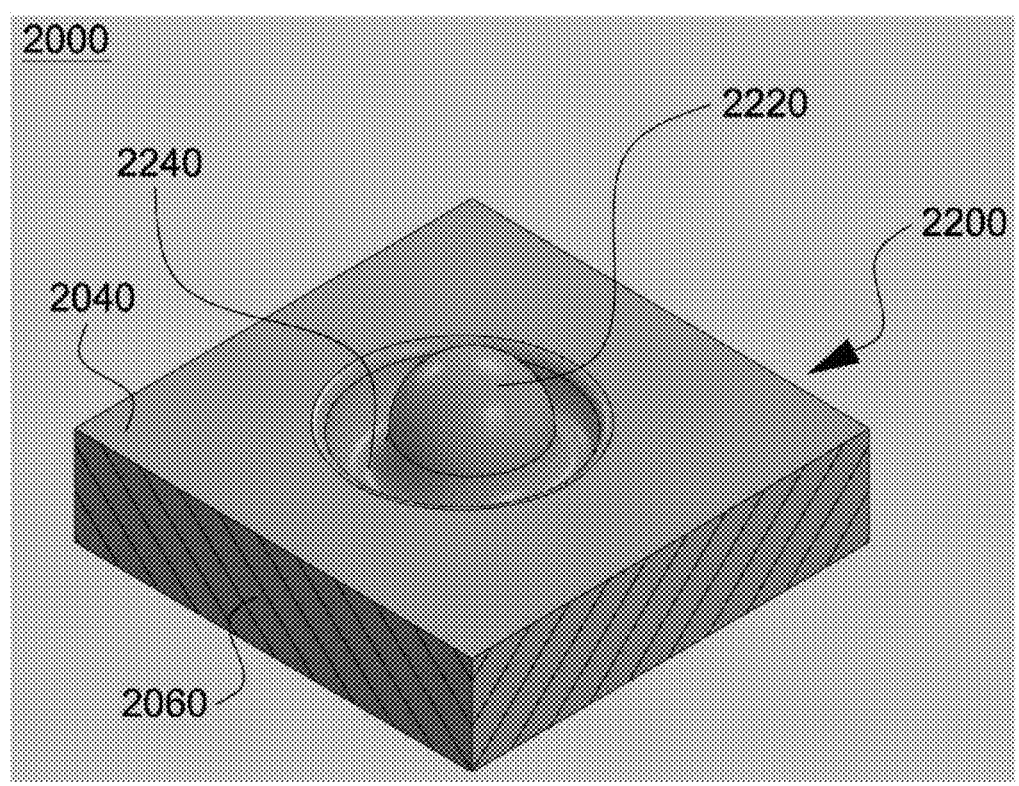
FIG. 12 is a perspective view of a second sample of a reflection pattern according to one embodiment of the present invention.
Figure 13:
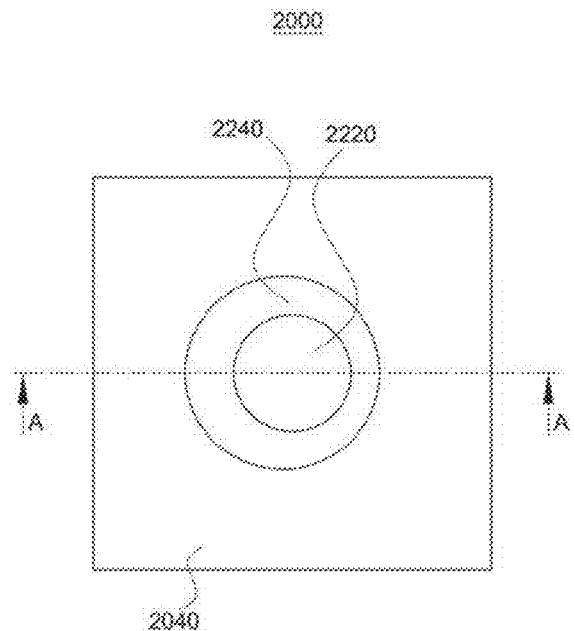
FIG. 13 is a plan view of the second sample of the reflection pattern according to one embodiment of the present invention.
Figure 14:
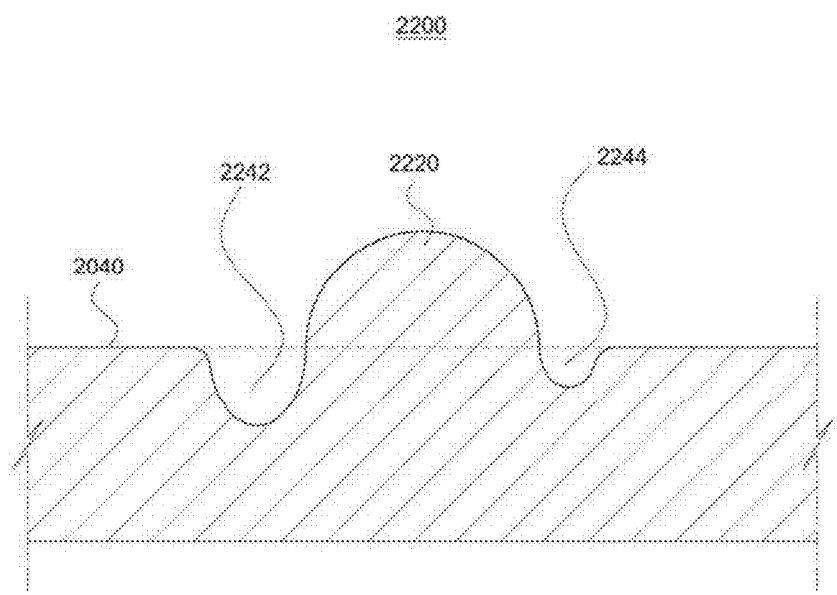
FIG. 14 is a cross-sectional view of the second sample of the reflection pattern according to one embodiment of the present invention.

FIG. 12 is a perspective view of the second sample of the reflection pattern 2200 according to one embodiment of the present invention, FIG. 13 is a plan view of the second sample of the reflection pattern 2200 according to one embodiment of the present invention, and FIG. 14 is a cross-sectional view of the second sample of the reflection pattern 2200 according to one embodiment of the present invention.

Referring to FIGS. 12, 13 and 14, a second form of the reflection pattern 2200 according to one embodiment of the present invention may include an embossed portion 2220 and a concave portion 2240 similar to the first form. However, the concave portion 2240 is recessed to have a constant depth in the first form, whereas recessed depths of concave portion 2240 may be different in the second form. Since a shape of the embossed portion 2220 in the second form of the reflection pattern 2200 may be entirely similar to the shape of the embossed portion 2220 in the first form of the reflection pattern 2200, the description thereof will be omitted.

In the reflection pattern 2200 of the second form, the concave portion 2240 may include a first concave region 2242 and a second concave region 2244, and in a cross sectional view in a direction perpendicular to the reflective surface 2040, a region having a wide interval from the center of the embossed portion 2220 to the outer circumference of the concave portion 2240 may be the first concave region 2242, and a region having a narrow interval from the center of the embossed portion 2220 to the outer circumference of concave portion 2240 may be the second concave region 2244.

In the reflection pattern 2200 of the second form, a recessed depth of the first concave region 2242 may be formed to be greater than a recessed depth of the second concave region 2244. Accordingly, the recessed depth may be decreased from the first concave region 2242 toward the second concave region 2244. Meanwhile, in some cases, the recessed depth of the second concave region 2244 may be formed to be smaller than the recessed depth of the first concave region 2242.

Hereinafter, a third sample of various forms for the reflection pattern 2200 according to one embodiment of the present invention will be described.

Figure 15:
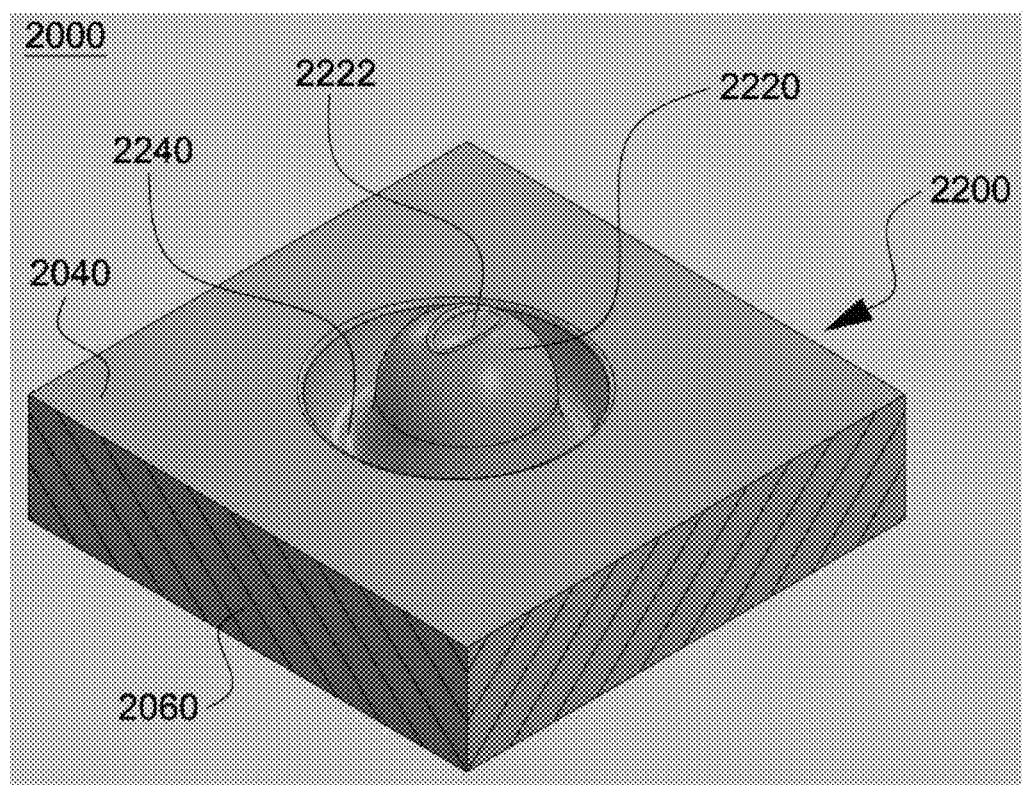
FIG. 15 is a perspective view of a third sample of a reflection pattern according to one embodiment of the present invention.
Figure 16:
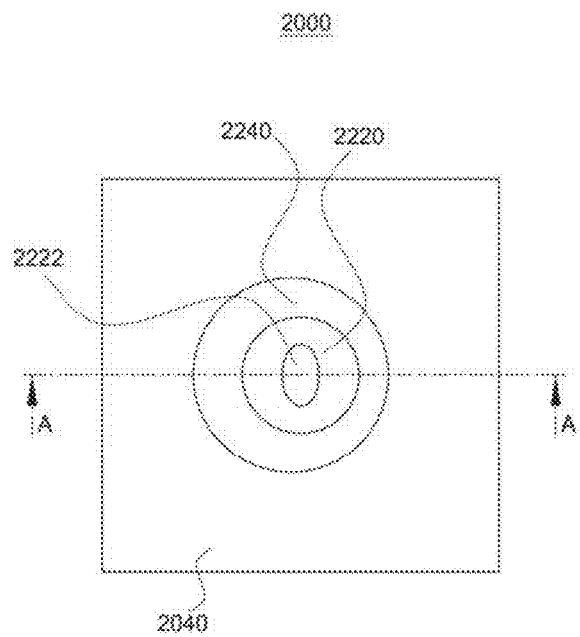
FIG. 16 is a plan view of the third sample of the reflection pattern according to one embodiment of the present invention.
Figure 17:
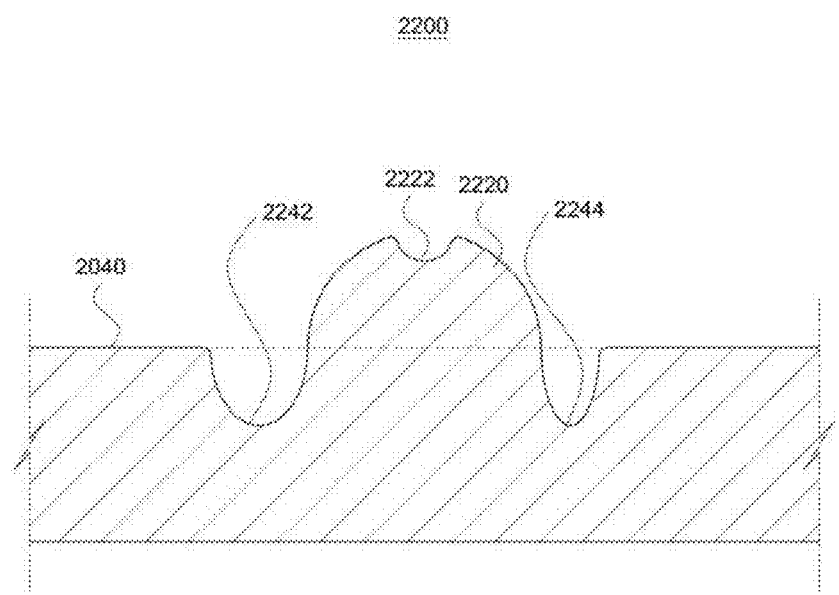
FIG. 17 is a cross-sectional view of the third sample of the reflection pattern according to one embodiment of the present invention.

FIG. 15 is a perspective view of the third sample of the reflection pattern 2200 according to one embodiment of the present invention, FIG. 16 is a plan view of the third sample of the reflection pattern 2200 according to one embodiment of the present invention, and FIG. 17 is a cross-sectional view of the third sample of the reflection pattern 2200 according to one embodiment of the present invention.

Referring to FIGS. 15, 16 and 17, a third form of the reflection pattern 2200 according to one embodiment of the present invention may include an embossed portion 2220 and a concave portion 2240 similar to the first form. However, the recessed region 2222 is not formed in the embossed portion 2220 in the first form, whereas the recessed region 2222 may be included in the embossed portion 2220 in the third form. Since a shape of the concave portion 2240 in the third form of the reflection pattern 2200 may be entirely similar to the shape of the concave portion 2240 in the first form of the reflection pattern 2200, the description thereof will be omitted.

The reflection pattern 2200 in the third form may further include the recessed region 2222 recessed in the center of the embossed portion 2220.

The recessed region 2222 may be formed by recessing a center portion of a surface of the reflection pattern 2200 in a hemispherical shape in which a height is increased in the center portion thereof.

The recessed region 2222 may be formed in an elliptical shape when viewed in a direction perpendicular to the reflective surface 2040. However, the recessed region 2222 does not have to be the elliptical shape, and any type of shape is acceptable when it has a major axis and a minor axis. For example, the recessed region 2222 may be formed in various shapes such as a lined elliptical shape, a long hole shape, etc. Further, the recessed region 2222 may be formed in a shape in which a depth is increased by recessing from the boundary thereof toward the center of the reflection pattern 2200

Hereinafter, a fourth sample of various forms for the reflection pattern 2200 according to one embodiment of the present invention will be described.

Figure 18:
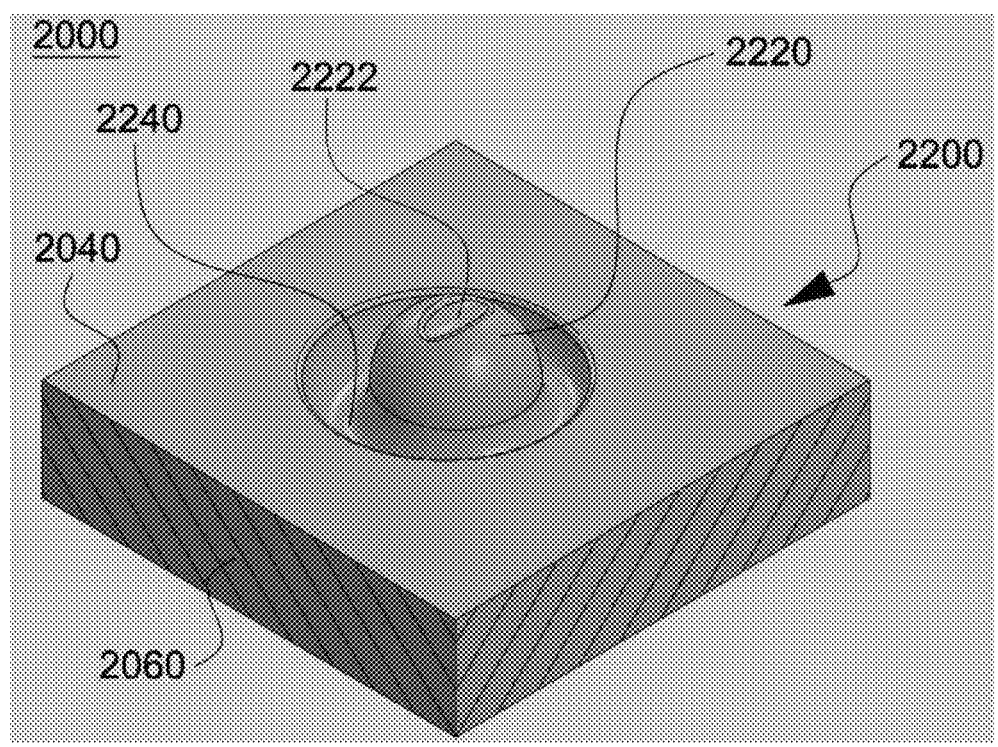
FIG. 18 is a perspective view of a fourth sample of a reflection pattern according to one embodiment of the present invention.
Figure 19:
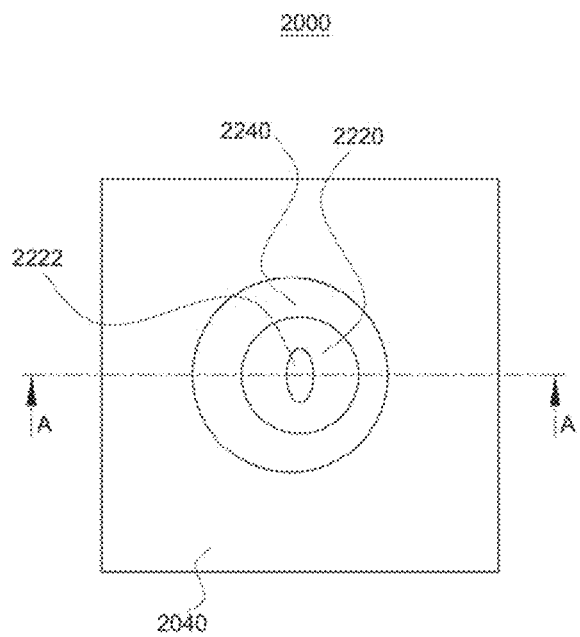
FIG. 19 is a plan view of the fourth sample of the reflection pattern according to one embodiment of the present invention.
Figure 20:
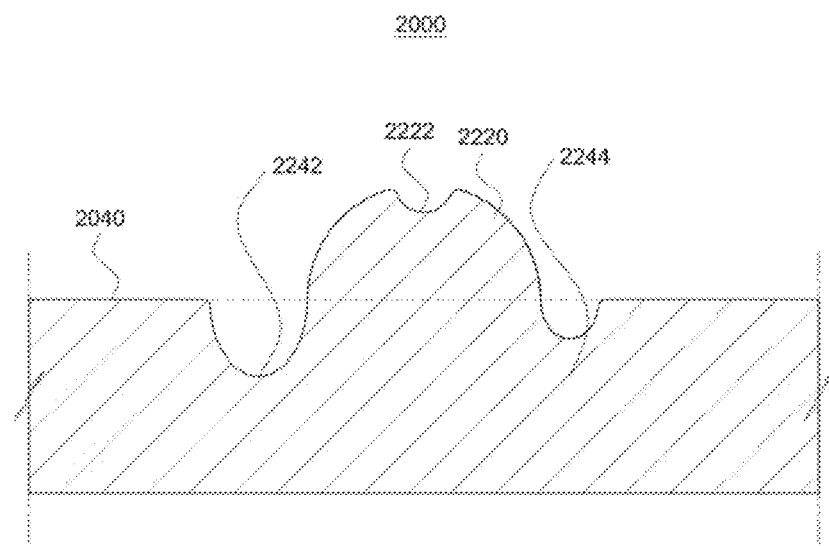
FIG. 20 is a cross-sectional view of the fourth sample of the reflection pattern according to one embodiment of the present invention.

FIG. 18 is a perspective view of the fourth sample of the reflection pattern 2200 according to one embodiment of the present invention, FIG. 19 is a plan view of the fourth sample of the reflection pattern 2200 according to one embodiment of the present invention, and FIG. 20 is a cross-sectional view of the fourth sample of the reflection pattern 2200 according to one embodiment of the present invention.

Referring to FIGS. 18, 19 and 20, a fourth form of the reflection pattern 2200 according to one embodiment of the present invention may have an embossed portion 2220 and a concave portion 2240 similar to the second form. However, the concave portion 2240 is recessed to have a constant depth in the third form, whereas recessed depths of the concave portion 2240 may be different in the fourth form. Since a shape of the embossed portion 2220 in the fourth form of the reflection pattern 2200 may be entirely similar to the shape of the embossed portion 2220 in the third form of the reflection pattern 2200, the description thereof will be omitted.

In the reflection pattern 2200 of the fourth form, the concave portion 2240 may include a first concave region 2242 having a relatively great recessed depth and a second concave region 2244 having a smaller recessed depth than the first concave region 2242.

In the reflection pattern 2200 of the fourth form, the concave portion 2240 may include the first concave region 2242 and the second concave region 2244, and in a cross sectional view in a direction perpendicular to the reflective surface 2040, a region having a wide interval from the center of the embossed portion 2220 to the outer circumference of the concave portion 2240 may be the first concave region 2242, and a region having a narrow interval from the center of the embossed portion 2220 to the outer circumference of concave portion 2240 may be the second concave region 2244.

In the reflection pattern 2200 of the fourth form, a recessed depth of the first concave region 2242 may be formed to be greater than a recessed depth of the second concave region 2244. Accordingly, the recessed depth may be decreased from the first concave region 2242 toward the second concave region 2244. Meanwhile, in some cases, the recessed depth of the second concave region 2244 may be formed to be smaller than the recessed depth of the first concave region 2242.

Hereinafter, a fifth sample of various forms for the reflection pattern 2200 according to one embodiment of the present invention will be described.

Figure 21:
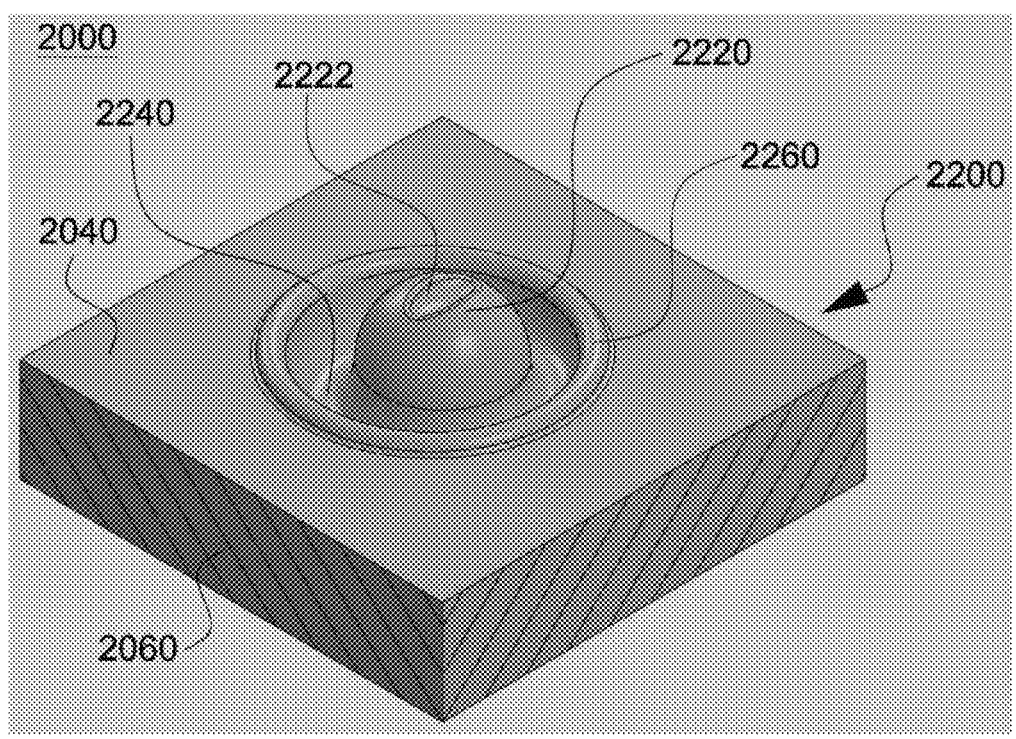
FIG. 21 is a perspective view of a fifth sample of a reflection pattern according to one embodiment of the present invention.
Figure 22:
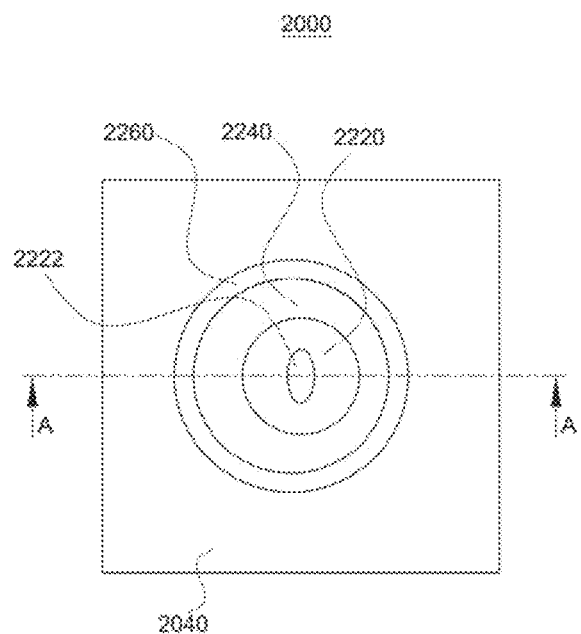
FIG. 22 is a plan view of the fifth sample of the reflection pattern according to one embodiment of the present invention.
Figure 23:
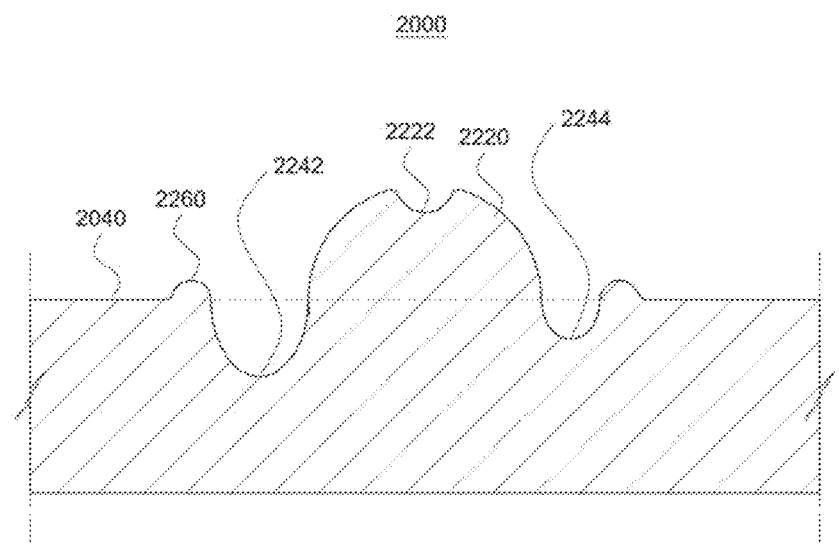
FIG. 23 is a cross-sectional view of the fifth sample of the reflection pattern according to one embodiment of the present invention.

FIG. 21 is a perspective view of the fifth sample of the reflection pattern 2200 according to one embodiment of the present invention, FIG. 22 is a plan view of the fifth sample of the reflection pattern 2200 according to one embodiment of the present invention, and FIG. 23 is a cross-sectional view of the fifth sample of the reflection pattern 2200 according to one embodiment of the present invention.

Referring to FIGS. 21, 22 and 23, the fifth form of the reflection pattern 2200 according to one embodiment of the present invention may have an embossed portion 2220 and a concave portion 2240 similar to the fourth form. However, the fifth form may include an outer portion 2260 which surrounds the concave portion 2240 and protrudes to the outside of the reflective surface 2040. Since shapes of the embossed portion 2220 and the concave portion 2240 in the fifth form of the reflection pattern 2200 may be entirely similar to the shapes of the embossed portion 2220 and the concave portion 2240 in the fourth form of the reflection pattern 2200, the descriptions thereof will be omitted.

In the reflection pattern 2200 of the fifth form, the outer portion 2260 is positioned to surround the concave portion 2240, and is a portion protruding to the outside of a level of the reflective surface 2040. Here, the outer portion 2260 may be formed in a ring shape when viewed in a direction perpendicular to the reflective surface 2040. The center of the ring forming the outer portion 2260 may be the same as the center of the ring forming the concave portion 2240.

In the reflection pattern 2200 of the fifth form, a height of an inner circumference of the outer portion 2260 (i.e., a boundary connected to the concave portion 2240) is flush with the level of the reflective surface 2040, and a height thereof is gradually increased to a maximum height from the inner circumference in a predetermined distance in proportion to a distance from the inner circumference, and after a portion at the maximum height is passed, the height is gradually decreased, and thus the height may be flush with the level of the reflective surface 2040 and an outer circumference thereof may be formed. Here, in the outer portion 2260, a slope of a portion near the inner circumference may be formed to be greater than that of a portion near the outer circumference. The outer portion 2260 of which a surface is processed in the curved shape as described above may have an advantageous effect of easily refracting, scattering, or reflecting incident light in a wide range. Particularly, the outer portion 2260 is disposed as an outermost portion in the reflection pattern 2200 and serves to first scatter light incident on the reflection pattern 2200 so that light reflected by the reflection pattern 2200 is scattered and diffused in a forward direction and guided to the light output surface 2020, and thus the luminance uniformity thereof can be greatly improved.

Meanwhile, in the reflection pattern 2200 of the fifth form, the outer portion 2260 is formed in a ring shape when viewed in a direction perpendicular to the reflective surface 2040, but the center of the ring forming the outer portion 2260 may be different from the center of the ring forming the concave portion 2240. Since the shape of the outer portion 2260 formed as described above is unsymmetrical, the optical characteristics thereof may be shown to be anisotropic rather than isotropic. In detail, the effect of light scattering is greater in the one direction in which both the thickness and the maximum height are great than in the opposite direction. A better viewing angle may be provided in the opposite direction compared to in the one direction. Accordingly, when the anisotropic optical characteristics are used, the luminance uniformity or viewing angle of the display device 1000 can be improved.

Figure 24:
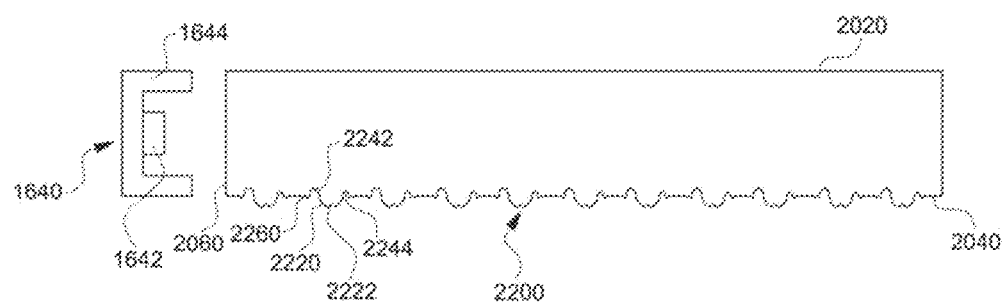
FIG. 24 is a cross-sectional view of a light guide plate having an unsymmetrical reflection pattern according to one embodiment of the present invention.

FIG. 24 is a cross-sectional view of a light guide plate 2000 having an unsymmetrical reflection pattern 2200 according to one embodiment of the present invention.

Referring to FIG. 24, a plurality of reflection patterns 2200 may be formed on the reflective surface 2040. In the reflection pattern 2200 of the fifth form, a first concave region 2242 formed to have a deep and wide recessed region may be formed on the light incident surface 2060. Accordingly, in one reflection pattern 2200, a recessed depth of the concave portion 2240 may be decreased in proportion to a distance from the light incident surface 2060.

Generally, light moving to the reflection pattern 2200 is mainly moved from a direction of the light incident surface 2060, and thus a region having the great recessed depth of the concave portion 2240 is disposed in a direction of incident light and the effects of light diffusion and scattering of the concave portion 2240 can be maximized.

Meanwhile, a viewing angle in a lateral direction is more important than a viewing angle in a vertical direction in the display device 1000, and thus, when a portion having the great maximum height of the embossed portion 2220 is disposed in the vertical direction while watching the display device 1000, the degradation of the viewing angle can be prevented. Furthermore, in a vertical viewing angle, according to which viewing angle between a viewing angle in a downward direction and a viewing angle in an upward direction is more important, the portion having the great maximum height of the embossed portion 2220 may be disposed in the upward direction or in the downward direction of the display device 1000.

Meanwhile, to be implemented for securing both of the luminance uniformity and the viewing angle of the display device 1000, the light source array 1640 is disposed in the downward direction and the reflection pattern 2200 is formed so that the portion having the great embossed portion 2220 in the reflection pattern 2200 is disposed in the downward direction, and thus both of the luminance uniformity and viewing angle can be realized.

Meanwhile, when there is a recessed region 2222, maximum heights of both sides of the embossed portion 2220 based on the recessed region 2222 may be different. Here, a maximum height of the embossed portion 2220 close to a portion having a great depth of the concave portion 2240 may be great. Here, when a portion having a great maximum height of the embossed portion 2220 is disposed close to the light incident surface 2060, the effect of light scattering is stronger than a case in which a protruding height is small. Thereby, the luminance uniformity and viewing angle of the display device 1000 can be improved.

Further, a major axis of the recessed region 2222 may be perpendicular to a line which connects the embossed portion 2220 and the canter of the concave portion 2240.

In the above-described reflection pattern 2200 according to one embodiment of the present invention, when comparing distances in a vertical direction (i.e., an absolute value of a height or depth), the maximum depth of the concave portion 2240 is the greatest, the maximum height of the embossed portion 2220 is the next greatest, and the maximum height of the outer portion 2260 may be the smallest. In detail, the height of the embossed portion 2220 may be approximately 1.2 to 8 times the height of the outer portion 2260, and the depth of the concave portion 2240 may be approximately 2 to 14 times the height of the outer portion 2260. Further, a diameter of the ring forming the concave portion 2240 may be 1.05 to 2 times a diameter of a circle forming the embossed portion 2220.

Further, in the reflection pattern 2200, a diameter of the embossed portion 2220 may be approximately 60 to 85% of an overall diameter, an outer diameter of the concave portion 2240 may be approximately 80 to 98% thereof, and an outer diameter of the outer portion 2260 may be approximately 85 to 100% thereof.

For example, in the reflection pattern 2200, the embossed portion 2220 may be formed to have a maximum height in a range of 1 to 7 µm, and a diameter (i.e., two times a radius which is a distance from the center of the reflection pattern 2200 to a point of which a height is flush with the level of the reflective surface 2040) in a range of 35 to 55 µm, the concave portion 2240 may be formed to have a maximum depth in a range of 2 to 13 µm and an outer diameter (i.e., two times a distance from the center of the reflection pattern 2200 to a point of which a height is flush with the level of the reflective surface 2040) in a range of 40 to 65 µm, and the outer portion 2260 may be formed to have a maximum height in a range of 0.5 to 5 µm and an outer diameter (i.e., two times a distance from the center of the reflection pattern 2200 to a point of which a height is flush with the level of the reflective surface 2040) in a range of 40 to 70 µm.

Further, when the reflection pattern 2200 may be formed in a curved surface shape, a slope angle at a portion in which the concave portion 2240 is connected to the outer portion 2260 may be the greatest, a slope angle at a portion in which the embossed portion 2220 is connected to the concave portion 2240 may be the next greatest, and a slope angle at a portion in which the outer portion 2260 is connected to the level of the reflective surface 2040 may be the smallest when comparing slope angles at each portion.

Further, the above drawings illustrate the smooth surface of the reflection pattern 2200, but the surface of the reflection pattern 2200 may have a predetermined roughness, and particularly, the concave portion 2240 and the outer portion 2260 may have a roughness having a predetermined value or more.

However, in the above descriptions, the specifications of the reflection pattern 2200 are not limited to the above-described height, depth, diameter, slope angle, roughness, etc., and it should be noted that they are suitably changeable if needed.

All of the reflection patterns 2200 formed on the reflective surface 2040 may be formed to have substantially the same specifications or different specifications of the reflection pattern 2200 based on portions of the reflective surface 2040 if needed. For example, when all of the reflection patterns 2200 are formed with the same specifications, there are advantages for manufacturing, and thus a production cost can be reduced. In the reverse case, when the diameter of the reflection pattern 2200 is adjusted to be smaller with the approach to the light incident surface 2060, the luminance uniformity of the entire light output surface 2020 of the light guide plate 2000 can be improved.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims.

GLOSSARY

1000: display device
1600: backlight unit
2000: light guide plate
2040: reflective surface
2060: light incident surface
2200: reflection pattern
2220: embossed portion
2222: recessed region
2240: concave portion
2242: first concave region
2244: second concave region
2260: outer portion

What is claimed is:

1. A light guide plate comprising:
a light output surface configured to output light to the outside;
a reflective surface positioned opposite the light output surface;
a light incident surface provided on at least one side surface of side surfaces which connect the light output surface and the reflective surface, and configured to receive light projected from a light source; and
a reflection pattern including an embossed portion having a circular shape and configured to protrude to the outside of the reflective surface when viewed in a direction perpendicular to the reflective surface, and a concave portion having a ring shape which surrounds the embossed portion and recessed in the reflective surface when viewed in a direction perpendicular to the reflective surface,
wherein the embossed portion protruding to the outside of a level of the reflective surface has an hemispherical shape which is rotational symmetric with respect to the center of the circle forming the embossed portion, and
wherein the center of the circle of the embossed portion is provided to be different from the center of the ring shape of the concave portion.

2. The light guide plate of claim 1, wherein the center of the ring shape of the concave portion is provided to be closer to the light incident surface than the center of the circle of the embossed portion.

3. The light guide plate of claim 1, wherein in the concave portion, a recessed depth of one side and a recessed depth of the other side based on the center of the embossed portion are different.

4. The light guide plate of claim 1, wherein an outer diameter of the concave portion is 1.05 to 1.3 times an outer diameter of the embossed portion.

5. The light guide plate of claim 1, wherein the embossed portion has a recessed region recessed in a direction of the light output surface.

6. The light guide plate of claim 1, wherein the reflection pattern further includes an outer portion having a ring shape which surrounds the concave portion and configured to protrude to the outside of the reflective surface when viewed in a direction perpendicular to the reflective surface.

7. The light guide plate of claim 3, wherein in the concave portion, a recessed depth of one side close to the light incident surface based on the center of the embossed portion is greater than the other side.

8. The light guide plate of claim 5, wherein a longitudinal direction of the recessed region is provided perpendicular to a direction from the center of the embossed portion toward the center of the concave portion.

9. The light guide plate of claim 5, wherein the recessed region is substantially formed in an elliptical shape in a bottom view.

10. The light guide plate of claim 5, wherein in the embossed portion, a protruding height of one side and a protruding height of the other side based on the recessed region are different.

11. The light guide plate of claim 5, wherein in the embossed portion, a protruding height of a side close to the light incident surface based on the recessed region is greater than a protruding height of a side far from the light incident surface.

12. A backlight unit comprising:
a light source configured to project light; and
a light guide plate,
wherein the light guide plate includes a light incident surface which faces the light source and receives the light projected from the light source, a light output surface which is perpendicular to the light incident surface and outputs the light to the outside, and a reflective surface opposite the light output surface, and a reflection pattern provided on the reflective surface,
wherein the reflection pattern includes an embossed portion having a circular shape and configured to protrude from the reflective surface when viewed in a direction perpendicular to the reflective surface, and a concave portion having a ring shape which surrounds the embossed portion and recessed in the reflective surface when viewed in a direction perpendicular to the reflective surface,
wherein the embossed portion protruding to the outside of a level of the reflective surface has an hemispherical shape which is rotational symmetric with respect to the center of the circle forming the embossed portion, and
wherein the center of the circle of the embossed portion is provided to be different from the center of the ring shape of the concave portion.

13. The backlight unit of claim 12, wherein the center of the ring shape of the concave portion is provided to be closer to the light incident surface than the center of the circle of the embossed portion.

14. The backlight unit of claim 12, wherein in the concave portion, a recessed depth of one side and a recessed depth of the other side based on the center of the embossed portion are different.

15. The backlight unit of claim 12, wherein in the concave portion, a recessed depth of one side close to the light incident surface based on the center of the embossed portion is greater than the other side.

16. The backlight unit of claim 12, wherein an outer diameter of the concave portion is 1.05 to 1.3 times an outer diameter of the embossed portion.

17. The backlight unit of claim 12, wherein the embossed portion has a recessed region recessed in the light output surface direction.

18. The backlight unit of claim 12, wherein a longitudinal direction of the recessed region is provided perpendicular to a direction from the center of the embossed portion toward the center of the concave portion.

19. The backlight unit of claim 12, wherein the reflection pattern further includes an outer portion having a ring shape which surrounds the concave portion and configured to protrude to the outside of the reflective surface when viewed in a direction perpendicular to the reflective surface.

20. The backlight unit of claim 17, wherein in the embossed portion, a protruding height of a side close to the light incident surface based on the recessed region is greater than a protruding height of a side far from the light incident surface.

* * * * *